(12) United States Patent
Oakley

(10) Patent No.: US 8,305,861 B2
(45) Date of Patent: Nov. 6, 2012

(54) ADAPTIVE READ AND READ-AFTER-WRITE FOR CARBON NANOTUBE RECORDERS

(76) Inventor: William S. Oakley, San Jose, CA (US)

( * ) Notice: Subject to any disclaimer, the term of this patent is extended or adjusted under 35 U.S.C. 154(b) by 494 days.

(21) Appl. No.: 10/563,457

(22) PCT Filed: Jun. 18, 2004

(86) PCT No.: PCT/US2004/019780
§ 371 (c)(1),
(2), (4) Date: Jan. 3, 2006

(87) PCT Pub. No.: WO2005/067585
PCT Pub. Date: Jul. 28, 2005

(65) Prior Publication Data
US 2006/0182005 A1    Aug. 17, 2006

Related U.S. Application Data

(60) Provisional application No. 60/484,631, filed on Jul. 3, 2003.

(51) Int. Cl.
*G11B 9/10* (2006.01)
(52) U.S. Cl. ........................................... 369/101
(58) Field of Classification Search ............. 360/75, 360/77.01, 77.11, 246.6, 77.06, 246.7; 369/101, 369/44.19; 720/669, 670
See application file for complete search history.

(56) References Cited

U.S. PATENT DOCUMENTS

| | | | |
|---|---|---|---|
| 3,737,589 A | 6/1973 | Redlich et al. | |
| 3,750,117 A | 7/1973 | Chen et al. | |
| 4,760,567 A * | 7/1988 | Crewe | 369/101 |
| 4,817,053 A * | 3/1989 | Ikeda et al. | 365/113 |
| 4,845,696 A | 7/1989 | Ohtsuki et al. | |
| 5,051,340 A | 9/1991 | Tyan et al. | |
| 5,216,219 A | 6/1993 | Yokozeki et al. | |
| 5,227,700 A | 7/1993 | Nagai et al. | |
| 5,270,990 A * | 12/1993 | Mizasawa et al. | 369/43 |
| 5,319,198 A | 6/1994 | Wada | |
| 5,348,811 A | 9/1994 | Nagao et al. | |

(Continued)

FOREIGN PATENT DOCUMENTS

JP    357208136    12/1982

(Continued)

OTHER PUBLICATIONS

International Seacrh Report of the International Searching Authority mailed Mar. 10, 2006, issued in connection with International Patent Application No. PCT/US05/08035 (1 page).

(Continued)

*Primary Examiner* — Hoa T Nguyen
*Assistant Examiner* — Mark Fischer
(74) *Attorney, Agent, or Firm* — McCarter & English, LLP

(57) ABSTRACT

A method and apparatus for adaptive read and read-after-write for carbon nanotube recorders is described. In one embodiment, the invention is an apparatus, utilizing carbon nanotubes (CNTs) to read and write data, and deflecting the emissions of such CNTs precisely in the process. In an alternate embodiment, the invention is a method of locating CNTs for purposes of reading and writing data on a disk, using a rough location and feedback to refine the location into a precise location for the track, both for a group of heads and for individual heads within the group. Location may include both physical movement of the heads and deflection of emissions of the heads.

6 Claims, 8 Drawing Sheets

U.S. PATENT DOCUMENTS

| | | | |
|---|---|---|---|
| 5,493,548 | A | 2/1996 | Kamioka |
| 5,557,596 | A | 9/1996 | Gibson et al. |
| 5,822,395 | A | 10/1998 | Schardt et al. |
| 5,849,458 | A | 12/1998 | Pan et al. |
| 6,312,303 | B1 | 11/2001 | Yaniv et al. |
| 6,361,861 | B2 | 3/2002 | Gao et al. |
| 6,401,526 | B1 | 6/2002 | Dai et al. |
| 6,519,221 | B1 | 2/2003 | Manalis et al. |
| 6,735,046 | B2* | 5/2004 | Nakayama et al. ............ 360/110 |
| 6,738,218 | B1* | 5/2004 | Hamada et al. ............ 360/77.02 |
| 6,928,042 | B2 | 8/2005 | Nickel |
| 6,977,108 | B2* | 12/2005 | Hieda et al. .................. 428/64.2 |
| 7,012,266 | B2 | 3/2006 | Jin |
| 7,068,582 | B2* | 6/2006 | Jin ................................ 369/101 |
| 2001/0040215 | A1 | 11/2001 | Ahmed et al. |
| 2002/0068199 | A1 | 6/2002 | Futamoto et al. |
| 2002/0182542 | A1 | 12/2002 | Choi et al. |
| 2003/0007442 | A1 | 1/2003 | Henrichs |
| 2003/0007443 | A1* | 1/2003 | Nickel .......................... 369/101 |
| 2003/0122073 | A1* | 7/2003 | Nakayama et al. ............ 250/306 |
| 2004/0080859 | A1* | 4/2004 | Teo et al. ................... 360/77.02 |
| 2004/0086802 | A1 | 5/2004 | Gibson |
| 2004/0125733 | A1 | 7/2004 | Lee et al. |
| 2005/0023460 | A1 | 2/2005 | Brown et al. |
| 2005/0094533 | A1 | 5/2005 | Gibson |
| 2006/0184843 | A1 | 8/2006 | Oakley |
| 2006/0187802 | A1 | 8/2006 | Oakley |
| 2009/0001289 | A1 | 1/2009 | Oakley |

FOREIGN PATENT DOCUMENTS

| | | |
|---|---|---|
| JP | 401092941 | 4/1989 |
| JP | 403228294 | 10/1991 |
| JP | 11-086738 | 3/1999 |
| JP | 2001-273688 | 10/2001 |
| JP | 2004-165518 | 6/2004 |
| KR | 20030008274 | 1/2003 |
| WO | WO 2004/075171 | 9/2004 |
| WO | WO 2005/013033 | 2/2005 |
| WO | WO 2005/067585 | 7/2005 |
| WO | WO 2005/089193 | 9/2005 |

OTHER PUBLICATIONS

Written Opinion of the International Searching Authority mailed Mar. 10, 2006, issued in connection with International Patent Application No. PCT/US05/08035 (3 pages).

International Seacrh Report of the International Searching Authority mailed Jul. 28, 2008, issued in connection with International Patent Application No. PCT/US04/19871 (3 pages).

Written Opinion of the International Searching Authority mailed Jul. 28, 2008, issued in connection with International Patent Application No. PCT/US04/19871 (5 pages).

International Search Report of the International Searching Authority mailed Jun. 19, 2007, issued in connection with International Patent Application No. PCT/US04/04125 (1 page).

Written Opinion of the International Searching Authority mailed Jun. 19, 2007, issued in connection with International Patent Application No. PCT/US04/04125 (3 pages).

International Search Report of the International Searching Authority mailed Aug. 15, 2008, issued in connection with International Patent Application No. PCT/US04/19870 (2 pages).

Written Opinion of the International Searching Authority mailed Aug. 15, 2008, issued in connection with International Patent Application No. PCT/US04/19870 (5 pages).

Office Action dated Oct. 19, 2011, from pending U.S. Appl. No. 10/593,025 (7 pages).

Office Action dated Feb. 22, 2011, from pending U.S. Appl. No. 10/593,025 (9 pages).

Office Action dated Dec. 23, 2011, from pending U.S. Appl. No. 10/563,456 (13 pages).

Office Action dated Apr. 1, 2011, from pending U.S. Appl. No. 10/563,456 (14 pages).

Office Action dated Apr. 28, 2010, from pending U.S. Appl. No. 10/563,456 (11 pages).

Office Action dated Aug. 18, 2009, from pending U.S. Appl. No. 10/563,456 (7 pages).

Office Action dated Nov. 26, 2008, from pending U.S. Appl. No. 10/563,456 (9 pages).

Interview Summary dated Oct. 16, 2008, from pending U.S. Appl. No. 10/563,456 (3 pages).

Office Action dated Jun. 9, 2008, from pending U.S. Appl. No. 10/563,456 (8 pages).

Office Action dated Sep. 12, 2011, from pending U.S. Appl. No. 10/545,485 (22 pages).

Office Action dated Oct. 14, 2010, from pending U.S. Appl. No. 10/545,485 (19 pages).

Office Action dated Feb. 22, 2010, from pending U.S. Appl. No. 10/545,485 (17 pages).

Office Action dated Apr. 27, 2009, from pending U.S. Appl. No. 10/545,485 (13 pages).

Office Action dated Apr. 24, 2012, from pending U.S. Appl. No. 10/545,485, filed on Aug. 12, 2002, Inventor(s): William S. Oakley (9 pages).

* cited by examiner

US 8,305,861 B2

ADAPTIVE READ AND READ-AFTER-WRITE FOR CARBON NANOTUBE RECORDERS

This application is a 35 USC 371 application of International Application No. PCT/US2004/019780 filed Jun. 18, 2004, designating the United States: which claims priority to U.S. Provisional Application No. 60/484,631 filed Jul. 3, 2003, now abandoned, both of which are hereby incorporated by reference in their entirety.

FIELD

The present invention relates to the field of data storage systems. More particularly, the present invention relates to data storage systems utilizing carbon nanotubes in conjunction with disk media.

BACKGROUND

Disk drive technology based on magnetic and laser technology continues to allow for denser information packing. However, each technology has its limits and defects, related to both physical limitations and mechanical limitations. Lasers and magnetic heads must be positioned by mechanical means and have minimum tolerances for the physical size of marks used to encode data on their respective media. Thus, it may be useful to provide an alternative method and apparatus for data storage and retrieval.

SUMMARY

A method and apparatus for adaptive read and read-after-write for carbon nanotube recorders is described. In one embodiment, the invention is an apparatus, utilizing carbon nanotubes (CNTs) to read and write data, and deflecting the emissions of such CNTs precisely in the process. In an alternate embodiment, the invention is a method of locating CNTs for purposes of reading and writing data on a disk, using a rough location and feedback to refine the location into a precise location for the track, both for a group of heads and for individual heads within the group. Location may include both physical movement of the heads and deflection of emissions of the heads.

BRIEF DESCRIPTION OF THE DRAWINGS

The accompanying drawings, which are incorporated in and form a part of this specification, illustrate embodiments of the invention and, together with the description, serve to explain the principles of the invention. The drawings should be understood as illustrative of the invention, rather than restrictive.

DETAILED DESCRIPTION

A method and apparatus for adaptive read and read-after-write for carbon nanotube (CNT) recorders is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

A method and apparatus for adaptive read and read-after-write for carbon nanotube recorders is described. In one embodiment, the invention is an apparatus, utilizing carbon nanotubes (CNTs) to read and write data, and deflecting the emissions of such CNTs precisely in the process. In an alternate embodiment, the invention is a method of locating CNTs for purposes of reading and writing data on a disk, using a rough location and feedback to refine the location into a precise location for the track, both for a group of heads and for individual heads within the group. Location may include both physical movement of the heads and deflection of emissions of the heads.

Figure 1:
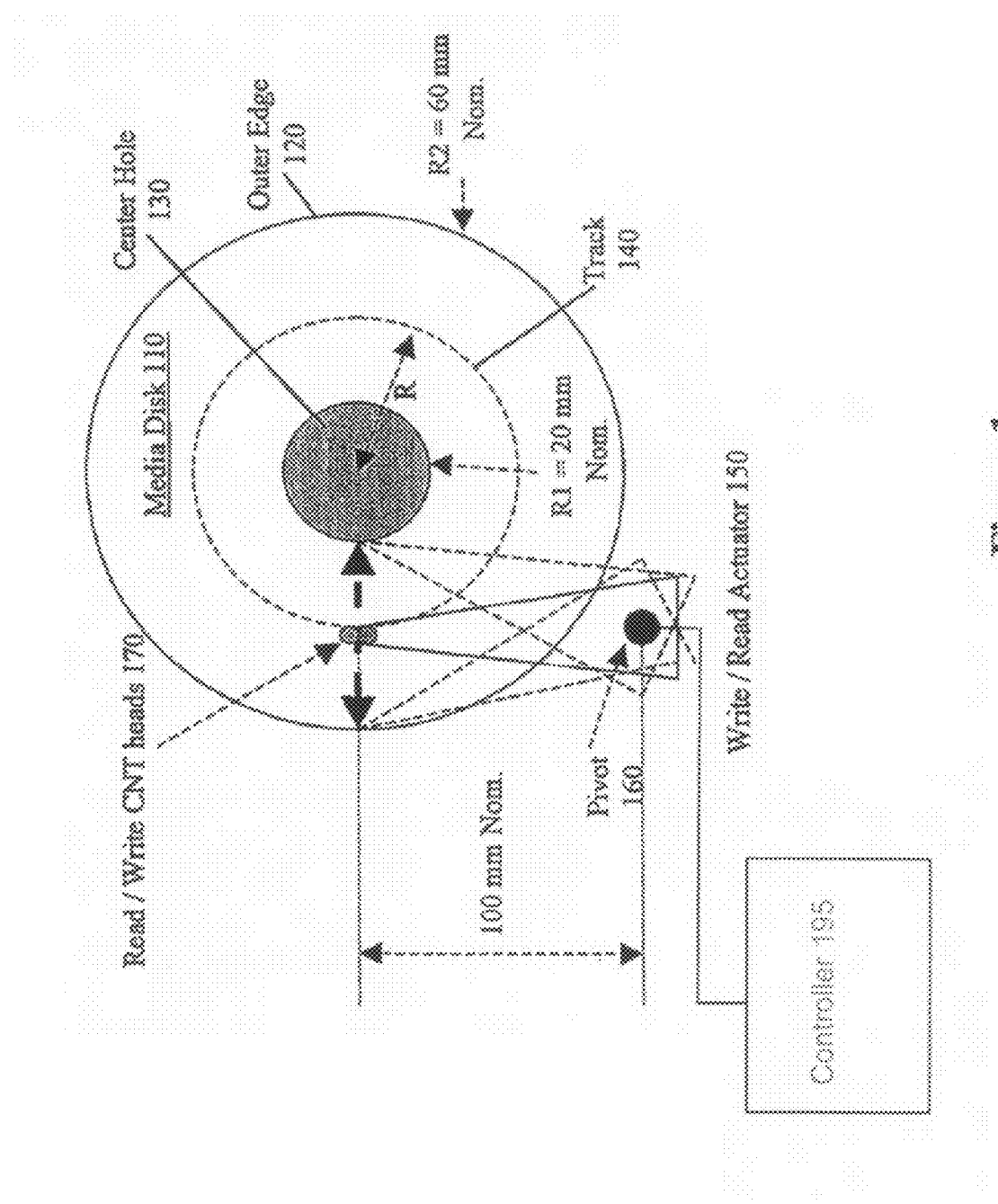
FIG. 1 is an embodiment of a disk configuration with a read/write head on a radial actuator

An embodiment of a disk drive recording configuration is shown in FIG. 1. Data is recorded on tracks in a circular or spiral pattern by the disk rotation and a recording head that is moved in essentially a radial path by means of a 'swing arm' actuator. The read-write heads are typically mounted on the actuator, rotation of which enables track acquisition between the minimum and maximum radii. In the design described herein the data is written to and read from the media by an electron beam (e-beam) emitted by a Carbon NanoTube (CNT) source located in the head(s). In operation the actuator 150 moves a few degrees to either side of its nominal position causing the associated actuator axis to move out of tangency to the track being written or read. If a single head 170 is implemented with write occurring on one rotation and read on a later disk rotation this slight rotation of the head axis with respect to the relative direction of disk motion is inconsequential.

As illustrated in FIG. 1, the actuator 150 has mounted thereon a head or heads 170 which can be used to read or write on track 140 (at a radius R from a center of disk 110) or on adjacent tracks on disk 110 (not shown). Actuator 150 moves around pivot 160, allowing for access to adjacent tracks, within performance limits. As shown, center hole 130 of disk 110 allows for placement of the disk 110 around a spindle (not shown) and thus eliminates the possibility of tracks within a radius R1, illustrated as 20 mm in one embodiment. Similarly, outer edge 120 defines the outer boundary of disk 110, at a radius R2 illustrated in one embodiment as 60 mm. Preferably, heads 170 (or other associated heads) may be used to read from and write on finely spaced tracks (such as track 140) throughout the surface of disk 110. Heads 170 and actuator 150 are coupled to a controller 195.

Figure 2:
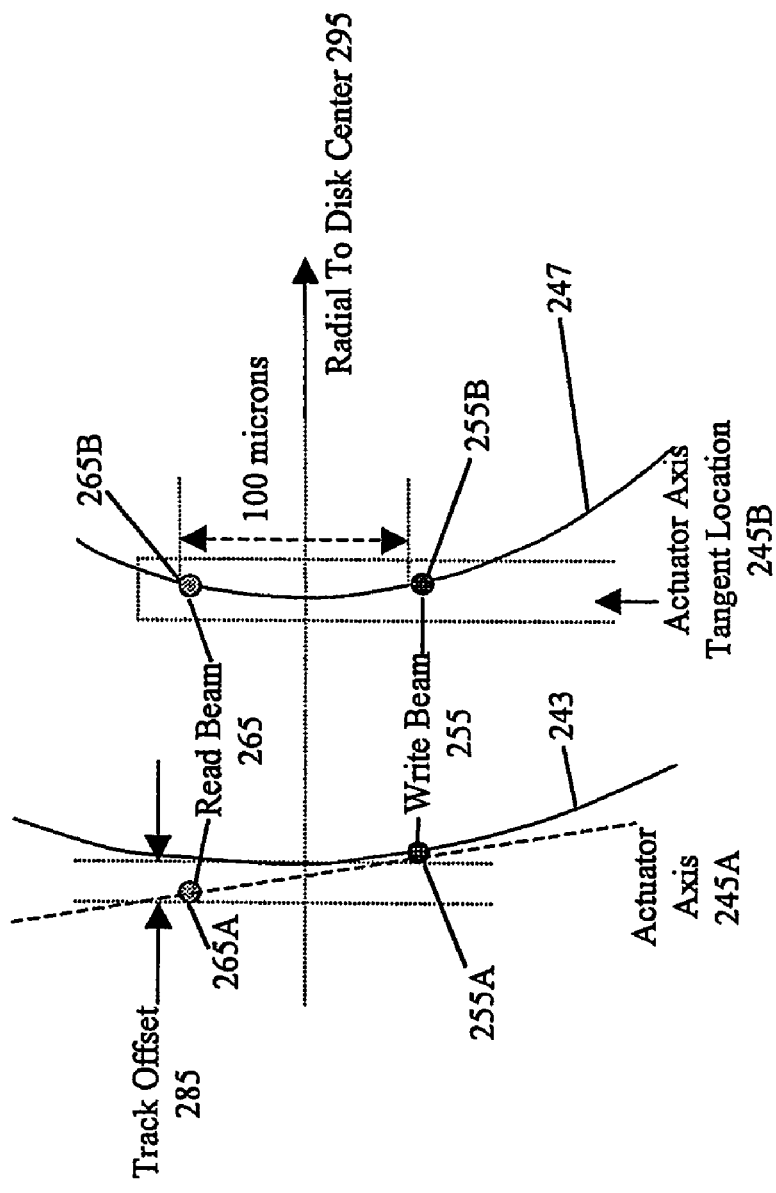
FIG. 2 is an illustration of track offset due to actuator angle change in the embodiment of FIG. 1.

However, attempting to provide an immediate read after write function by mounting two heads 170, a write head 170 and a read head 170 in tandem, is only effective at essentially one radius, R, where the line between the head locations is tangent to the track at that radius as shown in FIG. 2. On moving from a radius R to a radius R1 (e.g. 20 mm) or R2 (e.g. 60 mm) the angular movement of the actuator, although slight, causes the read and write detectors to move by dissimilar amounts, so they are no longer on the same track. If the radial distance moved from the tangent position at R=40 mm radius say, is ±20 mm, and approximately ±⅕$^{th}$ of the actuator length, the actuator angular rotation is ±11.3 degrees. If the write head leads the read head by 100 microns, the radial offset between the two heads is ±20 microns at the inner and outer radii. For a system track spacing of (for example) 20 nanometers this offset is 1000 tracks wide. Hence if the maximum tolerable offset is 0.2 track spacing, an actuator with tandem heads could only operate in the ⅕₀₀₀ of the disk radius closest to the tangency condition, i.e. over about ±20 adjacent tracks.

Further illustrating this problem, FIG. 2 indicates that while read beam 265 and write beam 255 are aligned when operating on track 247 (at positions 265B and 255B respectively), the beams (265 and 255) are not aligned when operating on track 243, as write position 255A is on track 243 but corresponding read position 265A is not on track 243. Note that the positions of beams 265 and 255 are both aligned to the actuator axis, whether in its first actuator axis position 245A or its second actuator axis position 245B. Moreover, note that the tracks 243 and 247 as illustrated in this embodiment are concentric circles having radials 295 pointing to the same center, as would be observed on disks using circular tracks.

One solution to this problem would be to locate the write and read heads on a sliding actuator that moves along the radius of the data disk without rotation. However for nanoscale mark recording where the track-to-track spacing is only a few tens of nanometers, mechanical tolerances make such an actuator impractical.

Another solution is to design an actuator system that allows the read head to effectively move to either side of the actuator center-line thereby reducing the track error to zero so the write and read heads follow the same track, regardless of the actuator arm angle. In the CNT microcathode system described here the read and track functions are accomplished by e-beams emitted from the CNT. These e-beams are easily deflected laterally, approximately along a radial, by magnetic or electrostatic means. Hence although one head physical location is typically offset from the other, moving one of the e-beams (by up to 20 microns in the above example), will place the write and read beams in alignment on the same data track. This offset is adjusted as the actuator relocates to any given track.

Figure 3:
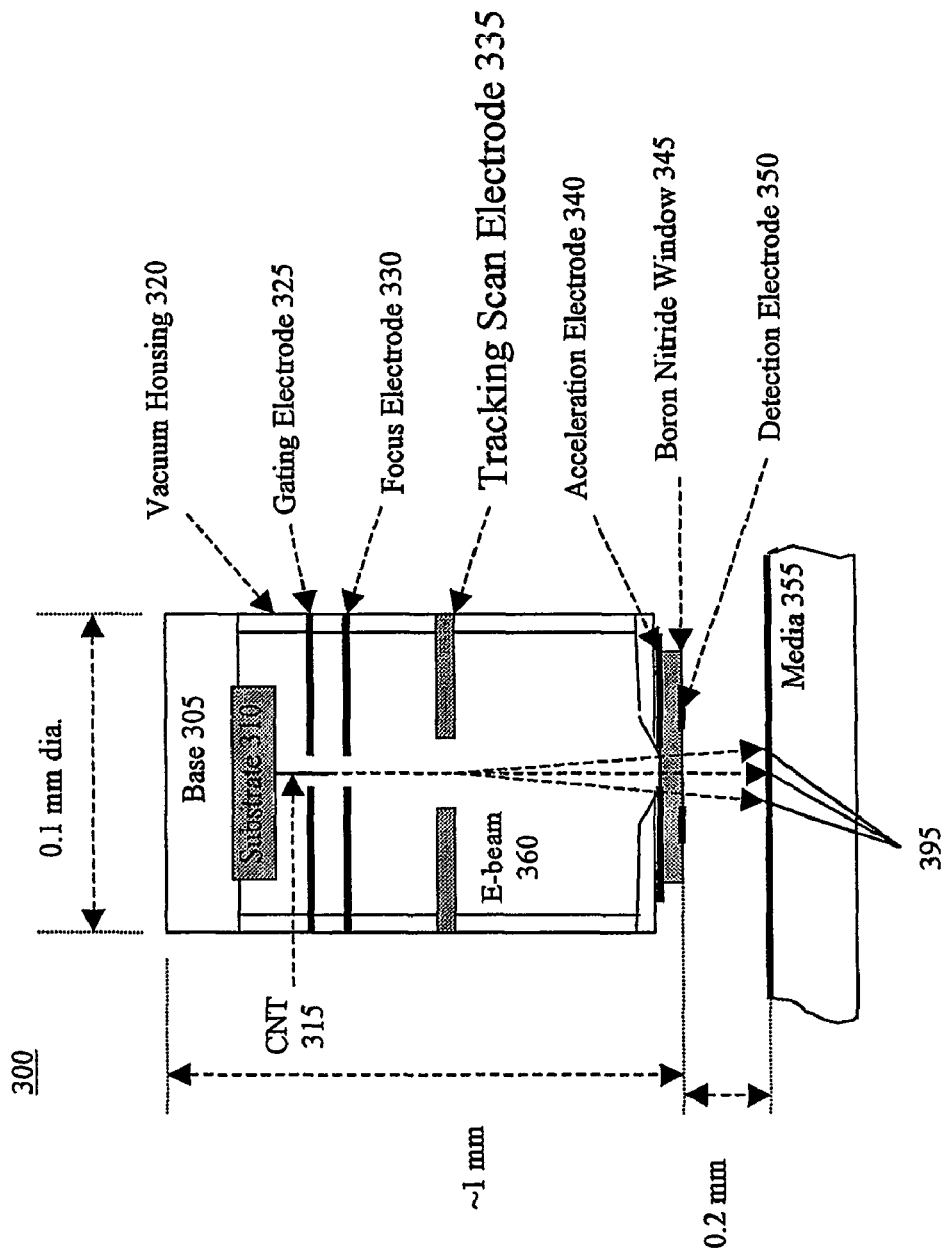
FIG. 3 is an embodiment of carbon nanotube (CNT) write and read heads.

FIG. 3 shows a CNT write head with an electrostatic beam deflector and the range of beam deflection. To perform the read-after-write function two such structures are located perhaps only 100 microns apart, or less, and consequently they should be fabricated on the same substrate. The read-write head assembly is essentially rotationally symmetric about the e-beam except for the deflection apparatus that is located so as to deflect the e-beam along a head diameter. The heads are aligned on the actuator so the beam deflection direction is essentially along a disk radial.

If the first head is the write head, the second head passing over a written bit will cause a temporal detection response. Alignment of the second (read) head to an exact trail position along the track can be achieved electronically by adjusting the read head offset to match the response of the read head to the data written to a track. If the disk write speed is, for example, 10 meters per second the time delay between the write and the read heads located 100 microns apart along the track is ten microseconds. Use of a dual beam oscilloscope to display both write and read patterns with one trace delayed by ten microsecond makes maximizing the read response an easy adjustment. The CNT microcathode, in one embodiment, is illustrated with specific implementation details for a read head in FIG. 3. Head 300 includes a base 305 having mounted thereon a substrate 310 from which a CNT 315 extends. Also mounted on base 305 is vacuum housing 320 which allows for an evacuated environment in which CNT 315 may operate. Within housing 320, gating electrode 325 (used to turn the electron stream 360 from CNT 315 on or off) and focus electrode 330 (used to focus the electron stream 360 from CNT 315) are located. Furthermore, tracking scan electrode 335 is also located within vacuum housing 320, allowing for deflection of e-beam 360 to each of locations 395 on media 355.

One end of housing 320 includes an opening around which acceleration electrode 340 is arranged. The opening of housing 320 is covered by a boron nitride window 345 which is relatively transparent to e-beam 360 but is relatively impervious to atmospheric transfer into vacuum housing. Arranged outside window 345 are detection electrodes 350 which may be used to detect scattered electrons bouncing back from media 355. As illustrated, base 305 and vacuum housing 320 have a width (diameter) of about 0.1 mm, with the overall structure having a length of about 1 mm and a spacing from media 355 of about 0.2 mm. These dimensions may be chosen based on specific design details, and are thus not requirements so much as a set of specifications useful in one embodiment. Moreover, the boron nitride window 345 is exemplary of a suitable window material, rather than a restrictive indication of the only suitable window material.

In the read-write CNT e-beam system described the data is written to the media by a beam sufficiently intense to cause a change in the media, resulting in a different level of electron Secondary Emission (SE) when probed by an e-beam of lower intensity, i.e. a read beam. The minimum distance between the two heads is determined by requiring the read-head detection signal not be corrupted by the secondary emission from the write beam, which is of higher power. The SE electron pattern from both heads is shown in FIG. 4 indicating the path of the secondary electrons is influenced by the field arising from the positive voltage on the detection electrode. Essentially all of the SE electrons generated by each head will be collected by its detector, if the geometric separation of the two heads is sufficient. Due to the SE electrons being generated at various depths within the media the SE emission pattern is estimated to be essentially Lambertian (a cosine distribution) as shown in FIG. 4. SE electrons emitted far off the primary e-beam axis will be deflected inward and collected by the detector, consequently very little channel crosstalk is generated as long as the separation of the heads (H.H.) is sufficient compared to the head-media (H.M.) separation.

Figure 4A:
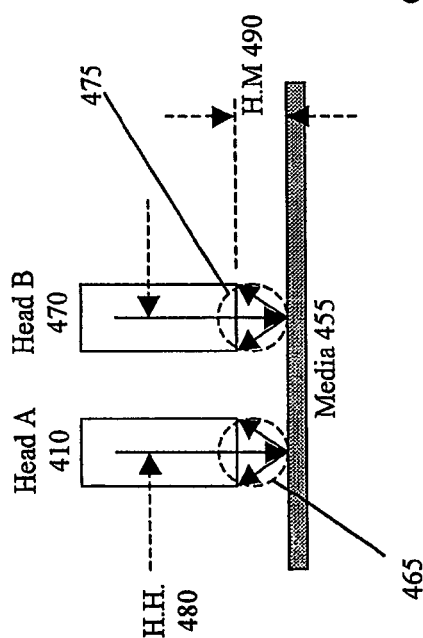
FIG. 4A and FIG. 4B illustrate embodiments of detection zones with diminished cross talk with multiple heads.

FIG. 4A illustrates in detail the separation between heads in one embodiment. Head A (410) and Head B (470) may be said to be separated by a distance HH 480 (head-head separation distance), which is measured from the centers of the heads 410 and 470. Scattering zones 465 and 475 are associated with heads 410 and 470 respectively, and represent the volume in which most electrons are likely to be scattered. Distance HM 490 represents the distance between head 470 and media 455 (and presumably between head 410 and media 455, too). As long as HH 480 is significantly larger than HM 490, scattering zones 465 and 475 may be expected to be small enough to result in relatively minimal crosstalk between heads 410 and 470. Actual requirements for HH 480 and HM 490 may be expected to depend on power used by heads 410 and 470, characteristics of media 455, and potentially other factors, such as range of travel of heads 410 and 470.

Figure 4B:
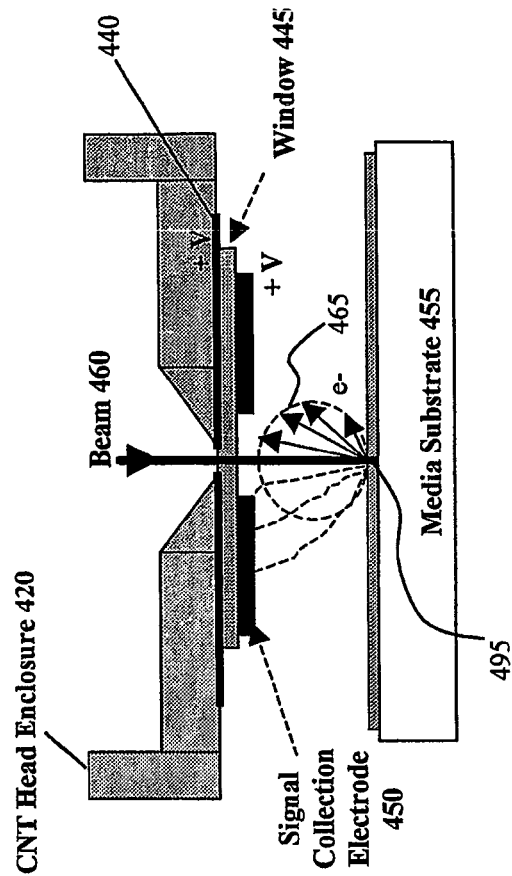

FIG. 4B illustrates in detail the operation of a head in one embodiment. CNT head enclosure 420 houses the CNT (not shown) which emits beam 460. Beam 460 is deflected or otherwise steered at an appropriate angle out of the opening through electrodes 440 (acceleration electrodes). Beam 460 passes through window 445 and impinges upon media 455 at location 495. From location 495, electrons 465 scatter, some of which are collected by signal collection electrode 450, resulting in a signal representing the data encoded or embodied by media 455. In addition to adjusting the beam to the optimum 'track read position' the e-beam deflector can be put to a second use in dynamically determining the beam position with respect to the disk track pattern. This may be achieved by use of a third head assembly where in addition to the dynamic offset a sinusoidal, triangular, or similar scan pattern is applied so the e-beam sweeps rhythmically across a track (or tracks). Track crossing timing can determine the beam location, and thereby the head location, relative to the track positions, thus enabling a tracking servo loop to be closed and the write beam to be centered between (or on) the tracks. As before the three head assemblies are fabricated as a one-piece assembly on a single substrate where the three heads are co-linear as in FIG. 5. The tracking/scan head may be placed ahead of the write head so that the tracking scan covers an unwritten track during the initial write sequence to a given track. This will prevent written data patterns from interfering with the tracking and permit tracking on preformatted media. Both the track beam and the read beam are offset from the write beam to a degree determined by the actuator arm angle, which is a function of the track radius selected.

In one embodiment, three identical heads are fabricated co-linearly on a single substrate with a sufficient spacing such that the return signal from one read beam does not interfere with the read signal of another. This separation may be obtained by alternate timing sequences, i.e. track position sensing only while the write beam is off. If some functions (track, write, read) are combined the read-write assembly need only contain two heads. For example if the read and scan functions are combined the read/scan head can be placed before or after the write head location, although this may force the system to a low duty cycle if read-after-write is implemented. Another option for a single head is to timeshare functions where the track scan is intermittent and occurs in conjunction either with a write or in conjunction with a read as shown in FIG. 6.

Figure 5A:
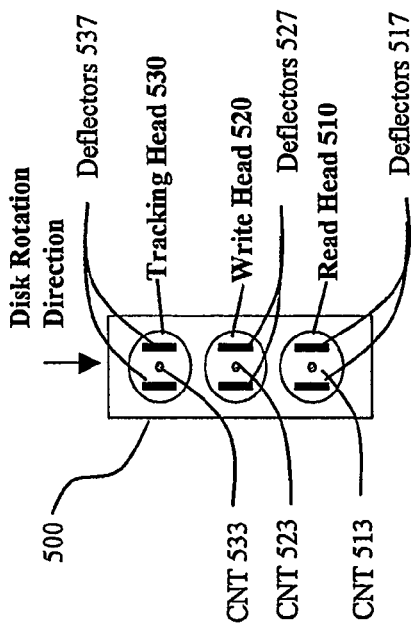
FIG. 5A and FIG. 5B illustrate an embodiment of a 3-head configuration, including track, write, and read heads, with FIG. 5A illustrating head locations and FIG. 5B illustrating initial offsets.
Figure 5B:
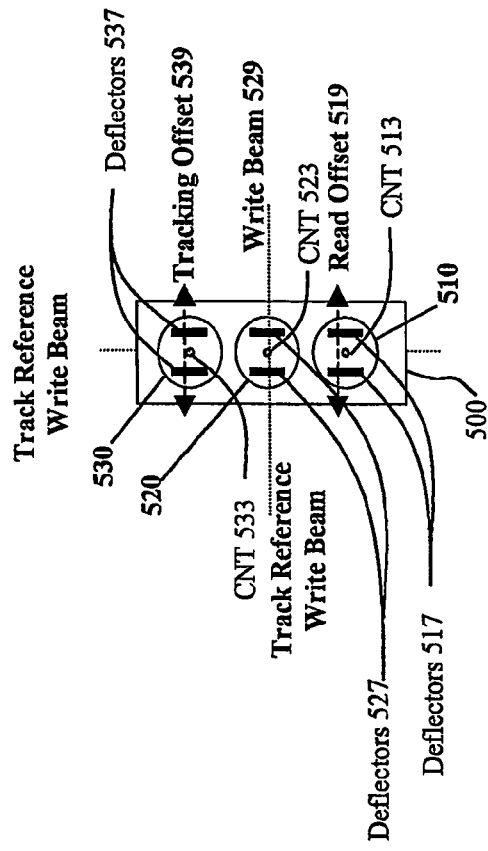

Referring to FIGS. 5A and 5B, an embodiment of a three-head system is illustrated. In FIG. 5A, an embodiment of system 500 includes Read head 510, write head 520 and tracking head 530 are all co-linear. Read head 510 includes CNT 513 and deflectors 517. Write head 520 includes CNT 523 and deflectors 527. Similarly, tracking head 530 includes CNT 533 and deflectors 537. As the underlying media (disk) rotates, a point on the disk first passes near (over, under or adjacent to) head 530 (for tracking), head 520 (for possible writing) and head 510 (for possible reading). Thus, a track on a disk may be tracked, written to, and read from during a single revolution of the disk. FIG. 5B illustrates that write beam 529 may be positioned to operate while tracking head 530 uses tracking offset 539 to adjust a tracking beam position and read head 510 uses read offset 519 to adjust a read beam location. In one embodiment, the symmetrical positioning of read head 510 and tracking head 530 about write head 520 allows for use of identical offsets 519 and 539, whereas in other embodiments, offsets 519 and 539 are individually calibrated to the specific locations of heads 510 and 530.

Figure 6:
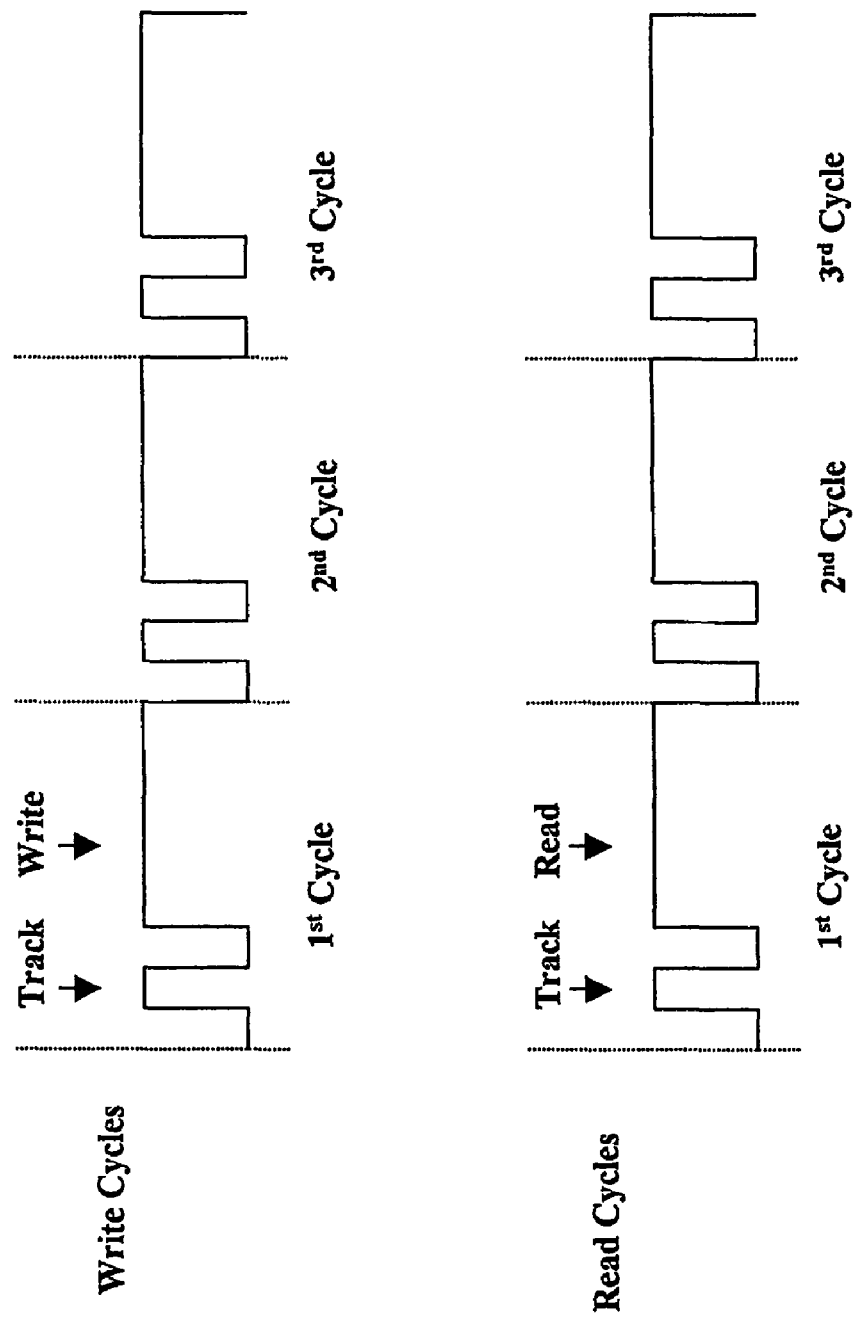
FIG. 6 is a timing diagram illustrating an embodiment of a single head 'Write & Track' and 'Read & Track' timing option.

A typical track selection and activation sequence is given in FIG. 6. In one embodiment, during each write cycle, an illustrated initial portion of the cycle is devoted to tracking and an illustrated portion of the cycle is used for writing. Similarly, in one embodiment, during each read cycle, an illustrated initial portion of the cycle is devoted to tracking and an illustrated portion of the cycle is used for reading. Thus, each read or write cycle may be expected to retrieve useful data, rather than data associated with inter-track noise.

Figure 7:
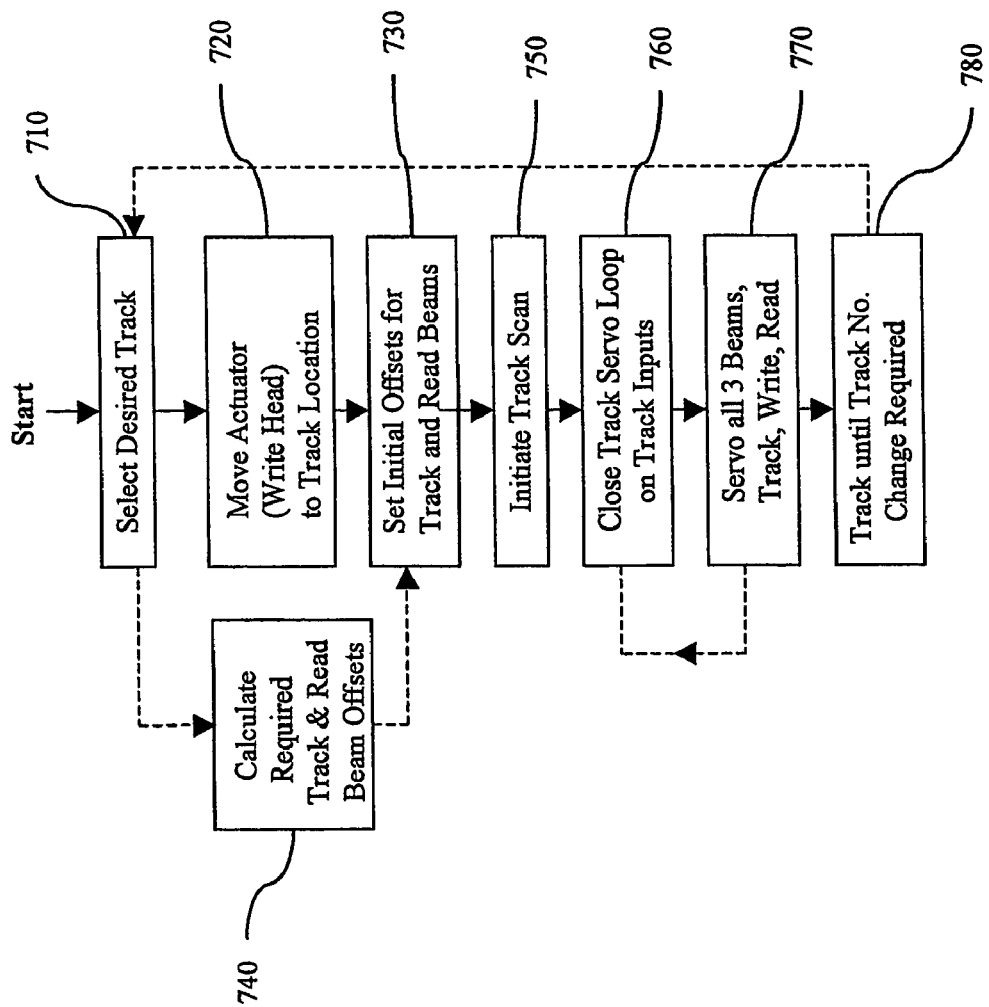
FIG. 7 illustrates an embodiment of a track acquisition sequence.

The track acquisition sequence is shown in FIG. 7, the actuator moves the write head to the approximate track location and a look-up table is used to determine the offsets for the tracking and read beams that are input as biases. Track seek is then actuated followed by acquisition and lock, and the tracking error signal is then superposed on each of the beams so that all three beams track with the offsets appropriate to the track radius being followed.

Further illustrating the embodiment of FIG. 7, the method begins at block 710 with selection of a desired track. At block 720, the actuator is moved to the expected location of the desired track. At block 740, tracking and read offsets are calculated, either in parallel or in series with the operations of block 720. At block 730, initial offsets for the tracking and read beams are set. At block 750, scanning occurs, determining if the desired track is aligned with the head(s). At block 760, the track servo loop is closed, adjusting the position of the head(s) as appropriate based on any feedback. At block 770, all three beams (track, read, and write) are monitored, creating feedback in the servo loop. Depending on the presence or absence of feedback in the servo loop, the process either flows back to block 760 or on to block 780, where the track is tracked until another track is desired. Note that the description above is based on a three head implementation, but adjustments based on the presence of one or two heads may be made within the spirit and scope of the present invention.

Figure 8:
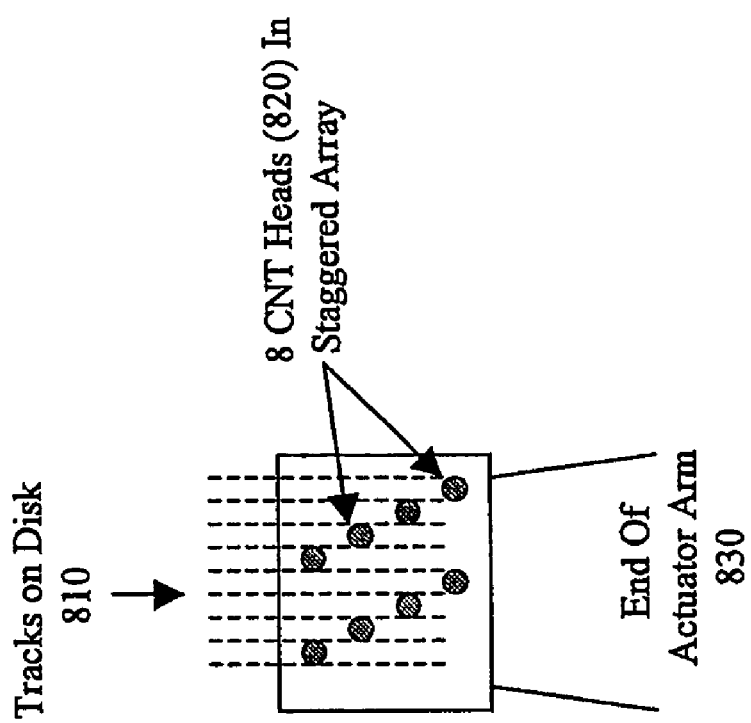
FIG. 8 illustrates an embodiment using parallel CNT operation for an increased data rate and lower rotation rate.

The ability to deflect the beam emanating from any given head also allows a small array of heads to be fabricated on a single chip arrayed in the radial direction, where the chip is located on the actuator arm and each head in the array is directed to a separate track. This allows simultaneous multi-beam operation for writing and reading on reasonably proximate tracks. Each 'head' can be a two or three head group implementing track, write, and read functions. The beam from each head can be deflected perhaps as much as 100 microns, allowing for coverage of any of 2000 tracks. As the heads can be located as close as about 10 microns, overlapping zones can be addressed. FIG. 8 shows a group of four (4) heads spaced on the same actuator so as to be radial to the disk. The beam from each head can be directed to a chosen track. This permits either a 4× increase in data rate at a given disk rotation rate, or a 4× decrease in rotation rate at a given aggregate data rate, etc. Groups of 8, 16 or perhaps more heads can be fabricated on a single chip and operated simultaneously on the same actuator.

In particular, CNT heads 820 are arrayed in groups of four (eight are illustrated) at an end of actuator arm 830, allowing for reading of concentrically parallel tracks 810 on a disk, thus allowing for reading or writing of 8 tracks nearly simultaneously. Note that the dimensions used within this example and within this document are exemplary rather than restrictive, and are thus not limiting on the spirit and scope of the present invention. Alternate embodiments may utilize different dimensions and tolerances due to differing design constraints while embodying the present invention.

From the foregoing, it will be appreciated that specific embodiments of the invention have been described herein for purposes of illustration, but that various modifications may be made without deviating from the spirit and scope of the invention. In some instances, reference has been made to characteristics likely to be present in various or some embodiments, but these characteristics are also not necessarily limiting on the spirit and scope of the invention. In the illustrations and description, structures have been provided which may be formed or assembled in other ways within the spirit and scope of the invention. Similarly, methods have been illustrated and described as linear processes, but such methods may have operations reordered or implemented in parallel within the spirit and scope of the invention. Accordingly, the invention is not limited except as by the appended claims.

The invention claimed is:

1. A method of operating a carbon nanotube head with a disk having tracks, comprising:
   locating the carbon nanotube head at a desired track at a rough precision by positioning an actuator to which the carbon nanotube head is attached in relation to the desired track;
   determining an offset for a read head of the carbon nanotube head based on the desired track through use of a controller, the controller coupled to the carbon nanotube head, the controller determining the offset responsive to an angle of the actuator;
   emitting an electron beam (e-beam) from a carbon nanotube of the carbon nanotube head;
   tracking the track through the read head using the offset;
   feeding back an indication of a location of the desired track at a fine precision;
   adjusting the offset responsive to the feeding back;
   adjusting a target of the carbon nanotube head responsive to the feeding back, the adjusting accomplished through deflection of the e-beam of the carbon nanotube head;
   writing data to the desired track from a write head of the carbon nanotube head;
   reading data from the desired track after writing data to the desired track, the reading occurring prior to the disk rotating through a complete rotation, the data read from locations on the desired track where writing data has occurred immediately preceding the reading data, the reading data occurring through use of the read head operating by deflecting the e-beam of the read head responsive to the offset;
   wherein:
      the read head of the carbon nanotube head including:
      a base,
      a substrate mounted on the base,
      the carbon nanotube fixedly mounted on the substrate,
      a housing mounted on the base,
      the housing enclosing the carbon nanotube,
      a gating electrode mounted on the housing,
      a focus electrode mounted on the housing,
      a tracking electrode mounted on and within the housing,
      an acceleration electrode mounted on and within the housing,
      an opening in the housing opposite the carbon nanotube,
      a boron-nitride window mounted on the housing and completely closing the opening of the housing,
      a detection electrode mounted on an external surface of the housing, the detection electrode to detect electrons reflected from a recording medium;
   and wherein:
   the write head of the carbon nanotube head including:
      a base,
      a substrate mounted on the base,
      a carbon nanotube on the substrate,
      a housing mounted on the base,
      the housing enclosing the carbon nanotube,
      a tracking electrode mounted on and within the housing,
      an acceleration electrode mounted on and within the housing,
      an opening in the housing opposite the carbon nanotube,
      a boron-nitride window mounted on the housing and completely closing the opening of the housing,
      a detection electrode mounted on an external surface of the housing;
   and wherein:
   the deflection of the e-beam includes deflecting the e-beam such that the e-beam concurrently traverses a plurality of the tracks;
   the tracking occurs based on signals received from the detection electrode of the read head; and
   the adjusting the target occurs through operation of the tracking electrode of the read head.

2. A method of operating a carbon nanotube head with a disk having tracks, comprising:
   locating the carbon nanotube head at a desired track at a rough precision by positioning an actuator to which the carbon nanotube head is attached in relation to the desired track;
   determining an offset for a read head of the carbon nanotube head based on the desired track through use of a controller, the controller coupled to the carbon nanotube head, the controller determining the offset responsive to an angle of the actuator;
   emitting an electron beam (e-beam) from a carbon nanotube of the carbon nanotube head;
   tracking the track through the read head using the offset;
   feeding back an indication of a location of the desired track at a fine precision;
   adjusting the offset responsive to the feeding back;
   adjusting a target of the carbon nanotube head responsive to the feeding back, the adjusting accomplished through deflection of the e-beam of the carbon nanotube head;
   wherein:
      the read head of the carbon nanotube head including:
      a base,
      a substrate mounted on the base,
      the carbon nanotube fixedly mounted on the substrate,
      a housing mounted on the base, a tracking electrode mounted on the housing,
      an acceleration electrode mounted on the housing,
      a detection electrode mounted on the housing;
   and wherein:
   the deflection of the e-beam includes deflecting the e-beam such that the e-beam concurrently traverses a plurality of the tracks;
   the tracking occurs based on signals received from the detection electrode; and
   the adjusting the target occurs through operation of the tracking electrode.

3. A method of operating a carbon nanotube head with a disk having tracks, comprising:
   locating the carbon nanotube head at a desired track at a rough precision;
   determining an offset for a read head of the carbon nanotube head based on the desired track, the determining of the offset being responsive to an angle of an actuator to which the carbon nanotube head is attached;
   emitting an electron beam (e-beam) from a carbon nanotube of the carbon nanotube head;
   tracking the track through the read head using the offset;
   feeding back an indication of a location of the desired track at a fine precision;
   adjusting the offset responsive to the feeding back;

adjusting a target of the carbon nanotube head responsive to the feeding back, the adjusting accomplished through deflection of the e-beam of the carbon nanotube head;
wherein:
the read head of the carbon nanotube head including:
   a base,
   a substrate mounted on the base,
   the carbon nanotube on the substrate,
   a housing mounted on the base,
   a tracking electrode mounted on the housing,
   an acceleration electrode mounted on the housing,
   a detection electrode mounted on the housing;
and wherein:
the deflection of the e-beam includes deflecting the e-beam such that the e-beam concurrently traverses a plurality of the tracks;
the tracking occurs based on signals received from the detection electrode; and
the adjusting the target occurs through operation of the tracking electrode.

4. The method of claim 3, wherein:
the locating the carbon nanotube head at the desired track at the rough precision occurs through positioning the actuator to which the carbon nanotube head is attached.

5. The method of claim 3, wherein:
the determining the offset for the read head based on the desired track occurs through operation of a controller, the controller coupled to the carbon nanotube head.

6. The method of claim 5, wherein:
the controller determines the offset responsive to the angle of the actuator.

* * * * *